Jan. 26, 1971 C. W. BEELIEN 3,558,411
PATTERNED ARTICLES MADE OF FILAMENTS INCLUDING
SEGMENTS OF DIFFERING COLOR, AND
METHOD OF MAKING THE SAME
Filed Aug. 2, 1968 3 Sheets-Sheet 3

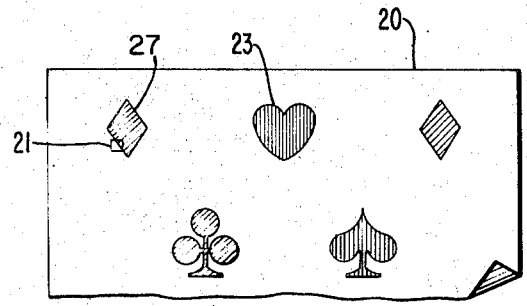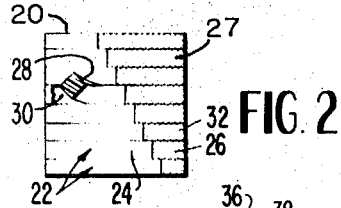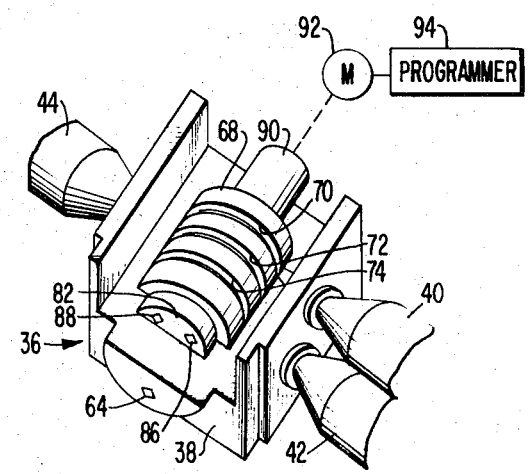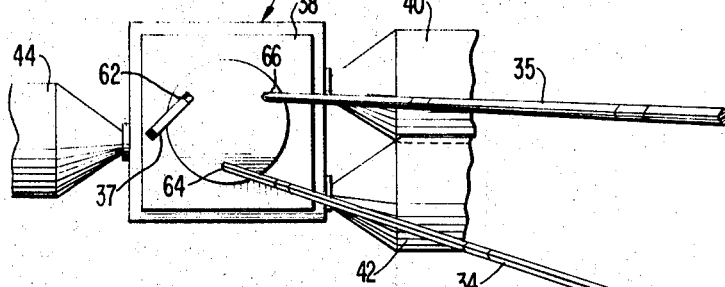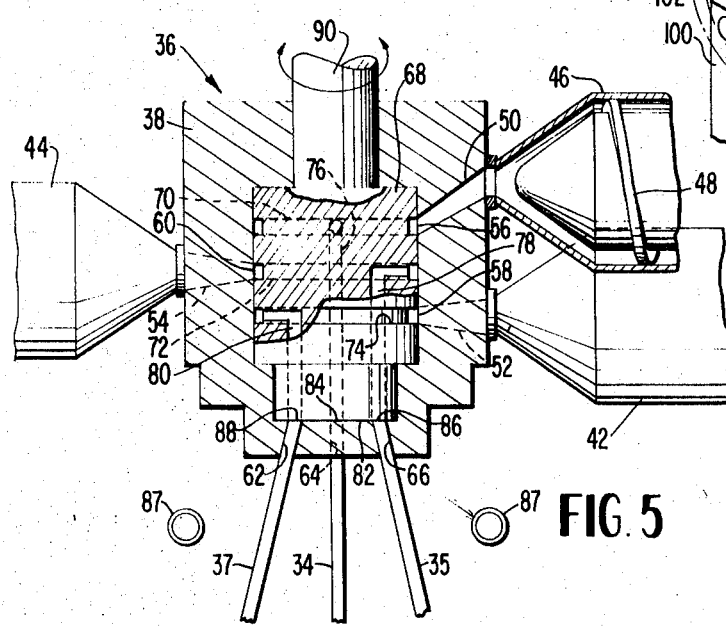

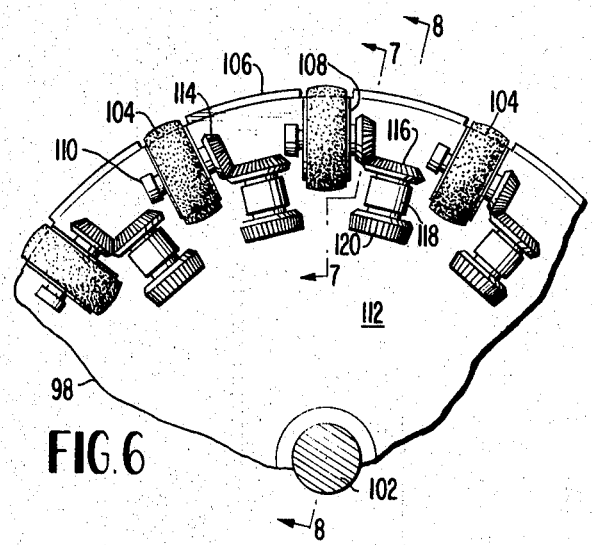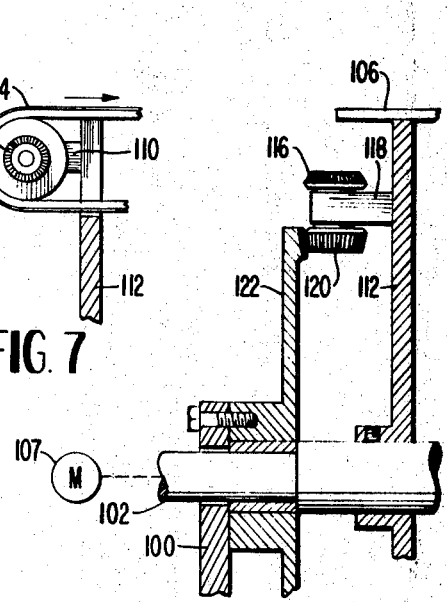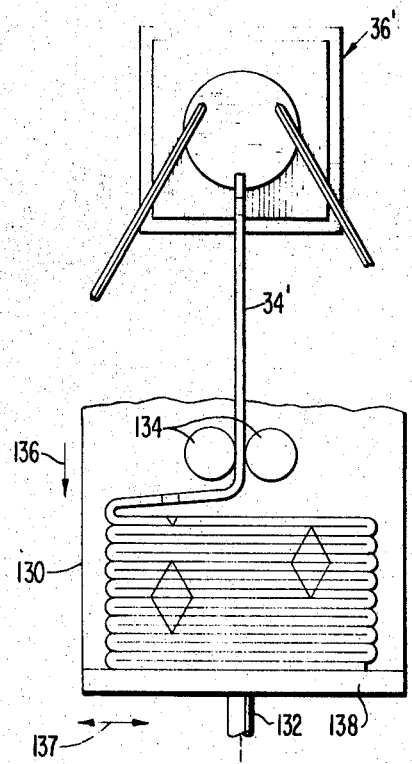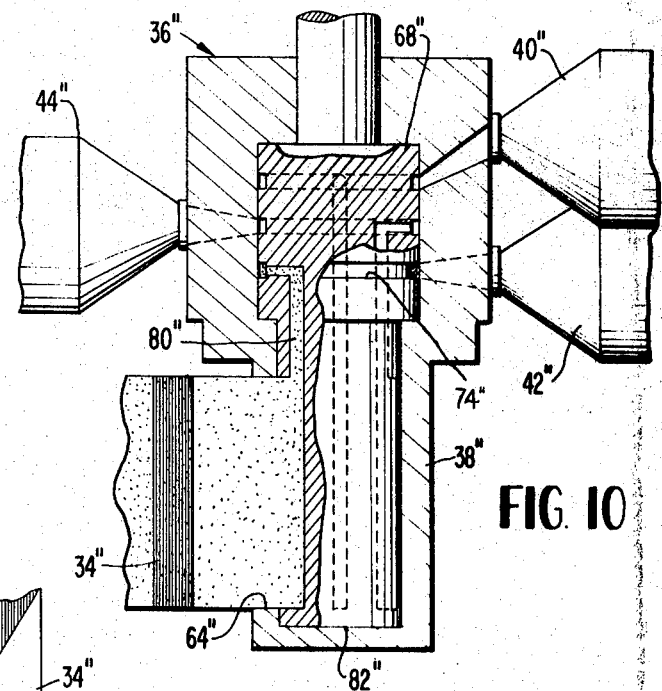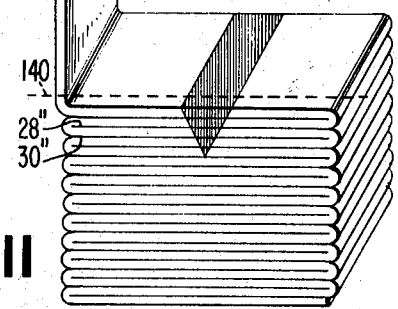

INVENTOR
CORNELIS W. BEELIEN

BY Shanley & O'Neil

ATTORNEYS

United States Patent Office 3,558,411
Patented Jan. 26, 1971

3,558,411
PATTERNED ARTICLES MADE OF FILAMENTS
INCLUDING SEGMENTS OF DIFFERING COLOR,
AND METHOD OF MAKING THE SAME
Cornelis W. Beelien, le Const. Huygensstraat 59,
Amsterdam, Netherlands
Continuation-in-part of abandoned application Ser. No.
402,974, Oct. 9, 1964. This application Aug. 2, 1968,
Ser. No. 749,763
Int. Cl. B32b 5/12
U.S. Cl. 161—60
12 Claims

ABSTRACT OF THE DISCLOSURE

Patterned articles of thermoplastic or other material are formed of filaments, each filament including a series of segments of differing color or other property. The filaments are positioned beside one another with segments in each filament aligned transversely with segments in transversely contiguous filaments to establish the pattern. The filaments are produced as portions of a continuous strand which is spirally wrapped or folded to position portions of the strand beside one another to transversely align the segments. The pattern extends through the thickness of the article, so it cannot be destroyed by surface wear. Continuous strands can be produced by extrusion or other method.

BACKGROUND OF THE INVENTION

This is a continuation-in-part of application Ser. No. 402,974, filled Oct. 9, 1964, and now abandoned.

This invention relates to patterned articles, and to systems for manufacturing such articles. In its more particular aspects, the invention pertains to thermoplastic sheets which include a decorative pattern.

Thermoplastic and other materials used for, e.g. coverings for floors or other objects, are desirably provided with patterns for decorative or other reasons. Patterns have been applied to the suface of such materials by coating processes, but when a coated object is placed in service where the surface is subject to wear, as is the case when the object is used as a floor covering, service wear which destroys the coating destroys the pattern. Also, when coating materials are applied at selected locations to form a surface pattern, as is sometimes done, the overall thickness of the object is not uniform.

It has been proposed to lay filaments of different colored materials side by side, and bond them together to form a sheet. This technique has the advantage of establishing a pattern which extends through the thickness of the material, and cannot be destroyed by surface wear. However, this proposal has a severe disadvantage in that the patterns can only take the form of stripes. This handicap makes the scheme unacceptable for many purposes, because patterns other than stripes are often required.

Accordingly, a main object of the invention is the provision of improved patterned articles in which the pattern extends through the thickness of the article, but the pattern can be of any desired design.

Other objects of the invention, its features and advantages will appear from the following detailed description which, when considered in connection with the accompanying drawings, discloses several embodiments of the invention.

BRIEF DESCRIPTION OF THE DRAWINGS

In the drawings, where similar reference characters denote similar elements throughout the several views:

FIG. 1 depicts a patterned sheet embodying principles of the invention;

FIG. 2 illustrates an enlarged portion of the sheet of FIG. 1;

FIG. 3 schematically illustrates a patterned article-making system embodying principles of the invention;

FIG. 4 is a schematic, cutaway isometric view of details of the system of FIG. 3;

FIG. 5 is a sectional view showing details of elements of FIG. 3;

FIG. 6 is another schematic view of details of FIG. 3;

FIG. 7 is a detail cross-sectional view taken on line 7—7 of FIG. 6;

FIG. 8 is a detail cross-sectional view taken on line 8—8 of FIG. 6;

FIG. 9 schematically depicts a modification of the system of FIG. 3;

FIG. 10 schematically illustrates another modification of the system of FIG. 3;

FIG. 11 schematically illustrates a technique for producing articles with the modification of FIG. 10;

DESCRIPTION OF THE ILLUSTRATED EMBODIMENTS

FIG. 1 depicts a thin, flat sheet 20 which includes a multicolor pattern of variform spaced-apart symbols in a background. As shown in FIG. 2, which is a magnification of portion 21 of FIG. 1, sheet 20 is composed of a plurality of very narrow, elongated filaments 22. Each filament 22 extends horizontally across sheet 20 from left to right in FIG. 1, and thus has an end-to-end length which extends across sheet 20.

Figure 13:
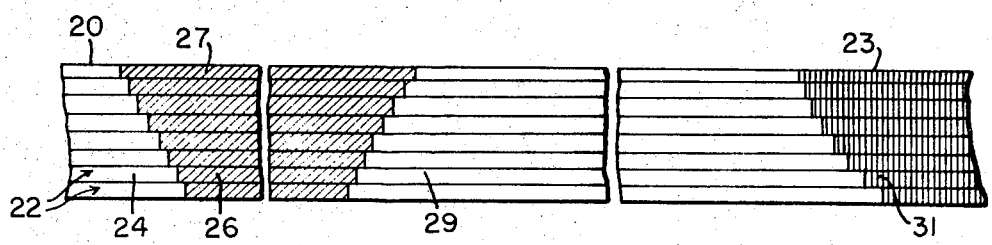
FIG. 13 is a view of details of FIGS. 1 and 2.

Each filament 22 is composed of a series of individually identifiable segments. Each segment is of thermoplastic material, and differs in color from serially contiguous segments. The segments are joined axially end-to-end to form the series of segments of which each filament 22 consists. For example, white segment 24 (FIG. 2) is joined at one end to a brown segment 26. From inspection of FIG. 1, it will be appreciated that segment 26 has an opposite end bonded to another white segment at the right side of diamond-shaped symbol 27, and that the latter white segment is bonded to a red segment at the left side of symbol 23. This is illustrated in detail in FIG. 13, where reference numeral 29 indicates the white segment which is bonded to brown segment 26 at the right side of diamond-shaped symbol 27, and reference numeral 31 indicates the red segment which is bonded to white segment 29 at the left side of heart-shaped symbol 23. It will further be understood that the red segment has an opposite end bonded to another white segment at the right side of symbol 23, and so on across sheet 20. Thus, differing colors of the various segments establish the pattern in sheet 20. In FIG. 1, one corner of flat sheet 20 is shown turned upwardly and in FIG. 2 one filament is shown broken and turned upwardly, for illustrative purposes.

As shown in FIG. 2, each filament 22 is of square transverse cross-section, although non-square cross-sectional configurations can be employed. Each filament 22 has transversely opposite sides 28, 30. Filaments 22 are positioned beside one another with segments of each filament aligned transversely with segments of each transversely contiguous filament to create the pattern in sheet 20. Opposing sides of transversely contiguous filaments are joined to one another, by fusion bonding or other suitable technique, to form a coherent sheet. The length of the individual segments can be varied at will, so that patterns of any desired design can be created in the sheet. For example, as will be appreciated from study of FIGS. 1 and 2, the length of brown segment 32 is slightly greater than that of brown segment 26 in the transversely contiguous filament. Brown segment in filaments contiguous to segments 32 and 26 are longer and shorter respectively than each of segments 32 and 26. Hence, when the filaments are laid side by side with brown segments of varying length in transverse alignment, diamond-shaped symbol 27 is progressively created.

The segments in filaments 22 are of uniform width and thickness. The width dimension of the filaments is the distance between opposite sides 28, 30. The thickness dimenion is normal to the width dimension. Stated differently, the thickness dimension is taken in a direction normal to the plane of the paper in FIG. 1. Since the filaments are of uniform thickness, the thickness of sheet 20 is uniform throughout.

Although each end of each segment is at right angles to sides 28, 30, the very narrow width of the filaments obscures this fact to a large extent when the sheet is viewed from a distance. Rather, the symbols appear to contain curved lines and lines extending at oblique angles. The narrower the filaments, the sharper the outline of the symbols and it is for this reason that the filaments are preferably not more than .5 mm. wide. The thickness of the filaments can vary as desired in accordance with desired sheet thickness.

FIG. 3 schematically illustrates a continuous system for making sheet 20. In this system, the filaments are sequentially produced as portions of a continuous strand 34, so that the filaments are axially joined end-to-end to form the strand. For clarity in illustration in FIGS. 3 and subsequent, the cross-sectional areas of the filaments have been enlarged.

In FIG. 3, a diehead 36 includes a body 38 and three extruders 40, 42, 44. The extruders are filled with thermoplastic materials. The material in each extruder differs in color from the material in every other extruder. All extruders are similar in structure, and each includes a casing as at 46 (FIG. 5), housing a screw as at 48. The screw continuously presses a flow of heat-plasticized thermoplastic material into body 38. From the extruders, separate continuous flows of thermoplastic material are forced through extruder discharge passageways 50, 52, 54, respectively. The passageways respectively include outlet apertures 56, 58, 60 in body 38.

Body 38 includes discharge orifices 62, 64, 66. A rotor 68 is mounted for rotational movement about its longitudinal axis in body 38. Rotor 68 communicates extruder outlets 56, 58, 60 with discharge orifices 64, 62, 66, respectively, so that continuous strands 34, 37, 35 are extruded through the discharge orifices.

Rotor 68 includes axially spaced-apart annular grooves 70, 72, 74 (FIGS. 4, 5), formed in the outer periphery of the rotor. Each groove is positioned opposite an extruder outlet, so that each groove is in fluid communication with an extruder outlet at all times irrespective of the angular position of the rotor. Hence, each groove is continuously filled with thermoplastic material from the associated extruder.

A plurality of passages 76, 78, 80 are formed in rotor 68, each passage communicating with an annular groove and extending axially to a rotor end wall 82. Passages 76, 78, 80 respectively include holes 84, 86, 88, formed in the rotor end wall. The holes and the discharge orifices are located at corresponding angular and radial positions relative to the rotor axis, so that each hole can be brought into registration with any of the discharge orifices by rotation of rotor 68. At the same time, the other holes will be respectively axially aligned with the other discharge orifices.

Rotor 68 is fixed to shaft 90, which is operatively connected in a conventional manner for rotation by a motor 92 (FIG. 4) under control of an automatic programmer 94. Motor 92 and programmer 94 can be of any suitable type of conventional design. By rotating rotor 68, a discharge orifice can be selectively communicated with a given extruder to produce a strand segment of the material in the extruder with the length of the segment varying with the time period the extruder is in communication with the discharge orifice. At the same time, each other extruder is in communication with another discharge orifice, extruding a segment of the respective colored material. At the end of the time period, the rotor is rapidly rotated to communicate each discharge orifice with another extruder, cutting off the segments just extruded. The heat-plasticized thermoplastic material in the rotor passages, under pressure from the extruders, enters the newly registered discharge orifices and fusion bonds to the segments previously extruded.

It is thus apparent that rotation of rotor 68 in a sequence creates a plurality of continuous strands, each composed of differently colored segments. By controlling in a predetermined manner the sequence of rotation of the rotor, the segment length, and the manner of locating portions of each strand beside one another, a thermoplastic article having any desired predetermined pattern can be created. FIG. 3 illustrates positioning apparatus 96 which can be used to locate portions of strand 34 beside one another with segments of each strand aligned transversely with segments in a transversely contiguous portion to form a desired pattern. It will be appreciated that similar positioners (not shown) are provided for strands 35 and 37 respectively, the strands radiating conically outwardly from diehead 36. A description of positioner 96 will impart understanding of all.

Positioner 96 includes a mandrel 98 mounted in brackets 100 for rotation about a longitudinal axis extending transversely to strand 34. Mandrel 98 has a shaft 102 rotated by a motor 107 (FIG. 8) to wind strand 34 on the mandrel. Mandrel 98 includes a plurality of endless conveyors 104 (FIGS. 3, 6, 7) positioned at peripheral locations around the mandrel so that each conveyor 104 has a radially outer reach which forms a portion of the mandrel periphery. Conveyors 104 run axially to the mandrel, and are crowned. Curved plates 106 are located between conveyors 104, and coact with the crowned conveyors to provide a generally circular cross-section for mandrel 98. If desired, the entire outer periphery of the mandrel can be composed of crowned conveyors.

Operation of endless conveyors 104 to move the reaches axially to the mandrel imparts a spiral configuration to the windings of strand 34 so that a continuous tube 23 is formed on the mandrel. The conveyors also continuously remove the tube from the mandrel, to make possible continuous production.

Conveyor driving is effected through drive rollers 108 (FIGS. 6, 7) which are rotatably mounted in brackets 110 on end wall 112 of mandrel 98. Rollers 108 are fixed to bevel gears 114, which mesh with bevel gears 116. Gears 116 are rotatably mounted in brackets 118 on mandrel end wall 112. Each bevel gear 116 is fixed to a bevel gear 120, which meshes with a ring gear 122 (FIG. 8) having a hub fixed to mandrel support bracket 100 around shaft 102. Rotation of mandrel 98 thus forces bevel gears 120 to rotate, and drive conveyors 104.

It will be recalled that the segments are fusion bonded to one another in the diehead discharge orifices. As they approach the outlet end of the discharge orifices, the strands are progressively cooled and become self-supporting, coherent members. A cooling arrangement can be provided around each discharge orifice to assure this result. FIG. 5 illustrates an annular spray nozzle 87 which applies a cooling water spray to the diehead end wall and the emerging strands but other cooling arrangements can be employed. If desired, heat can be applied to the remainder of the diehead to maintain the thermoplastic material in the extruder and rotor passages in heat-plasticized condition.

Positioner 96 places portions of coherent strand 34 adjacent one another in a spiral winding so that each convolution of the spirally wrapped strand constitutes a filament such as 22 of FIG. 1. A slight amount of slack can be maintained in each strand to prevent rotation of the mandrel from pulling the strand from the discharge orifices when the rotor is operated to change colors. The transversely opposite sides of the filaments in the strand must be joined together so that a coherent tube is formed. This is effected by a radiant heat lamp 128 (FIG. 3) which heats the spirally wound strand so that opposing sides of transversely contiguous filaments are fused to form a bond between transversely contiguous filaments. Heat can be applied in other ways to form a fusion bond, for example by heating the mandrel. Also, joining can be effected by other fusion and non-fusion techniques.

The tube 23 which is continuously formed by spiral winding of strand 34 is progressively moved axially relative to the mandrel by conveyors 104. The continuously moving tube is axially slit by cooperating rotary slitters 124. The slit tube is flattened by passing between opposing pairs of cooperating rollers 126 to form a continuous, patterned sheet 20.

It will be appreciated that patterned sheets can be made in any desired regular or irregular pattern by the foregoing system. Since each segment is uniform in color throughout, the pattern extends through the sheet thickness so that it cannot be destroyed by surface wear. Since the segments can be produced in any desired predetermined sequence and length and aligned transversely in any desired predetermined arrangement, any desired pattern can be constructed. The sheets are uniform in thickness, and can be continuously produced in any desired width. With positioner 96, the mandrel diameter determines the sheet width, which for example can be 4 m. Positioner 96, with its endless conveyors, permits continuous production, the conveyors making possible the continuous removal of the tube for formation of a continuous sheet. Also, since the conveyors remove the tube by friction between tube and conveyors, pulling or pushing on an edge of the flexible thermoplastic material is avoided. The material of the sheet can be polyvinyl chloride, vinyl, nylon, or other thermoplastic material. With continuous production of a plurality of strands, the system of FIG. 3 permits continuous production of a plurality of sheets with patterns of the same shape but differing color arrangements.

FIG. 9 diagrammatically illustrates a patterned sheet-forming system in which a continuous strand 34', extruded from diehead 36' in the manner discussed in connection with FIG. 3, is folded in laps on a plate 130. Plate 130, viewed in plan in FIG. 9, is operatively connected through shaft 132 in any suitable, conventional manner to motor 135 to oscillate as shown by directional arrow 137. Continuous strand 34' passes between fixed-axis driven rollers 134 which are suspended above plate 130. Oscillation of plate 130 folds the strand into laps, each lap constituting a filament such as 22 of FIG. 2. Plate 130 in FIG. 9 is progressively moved in the direction of arrow 136 to accommodate the growing length of the sheet. Upstanding ledge 138 facilitates formation of the first lap. Contiguous laps are joined to one another by fusion or other suitable method as discussed hereinabove.

FIG. 10 shows a modified diehead 36" which extrudes continuous strands having a rectangular cross-sectional configuration. Strand 34" is elongated in thickness dimension, which is taken a direction normal to the width between transversely opposite sides 28", 30" (FIG. 11), and for example can be ten or more times the width. In diehead 36", the holes in the rotor which communicate via passages, e.g. 80", with the annular grooves such as 74", are formed in the rotor side wall instead of end wall 82". However, the holes are registrable with discharge orifices, e.g. 64", located in side walls of body 38" so that the principles of operation of diehead 36" are the same as those of diehead 36.

As will be understood from FIG. 11, strand 34" is folded on a substrate, for example as shown in FIG. 9, to form a block from which sheets of uniform thickness can be shaved along a plane normal to the thickness of the strand. Thus, for example, a sheet can be shaved from the block along dotted line 140, and the sides of the sheet can be trimmed to provide a straight instead of scalloped edge.

Figure 12:
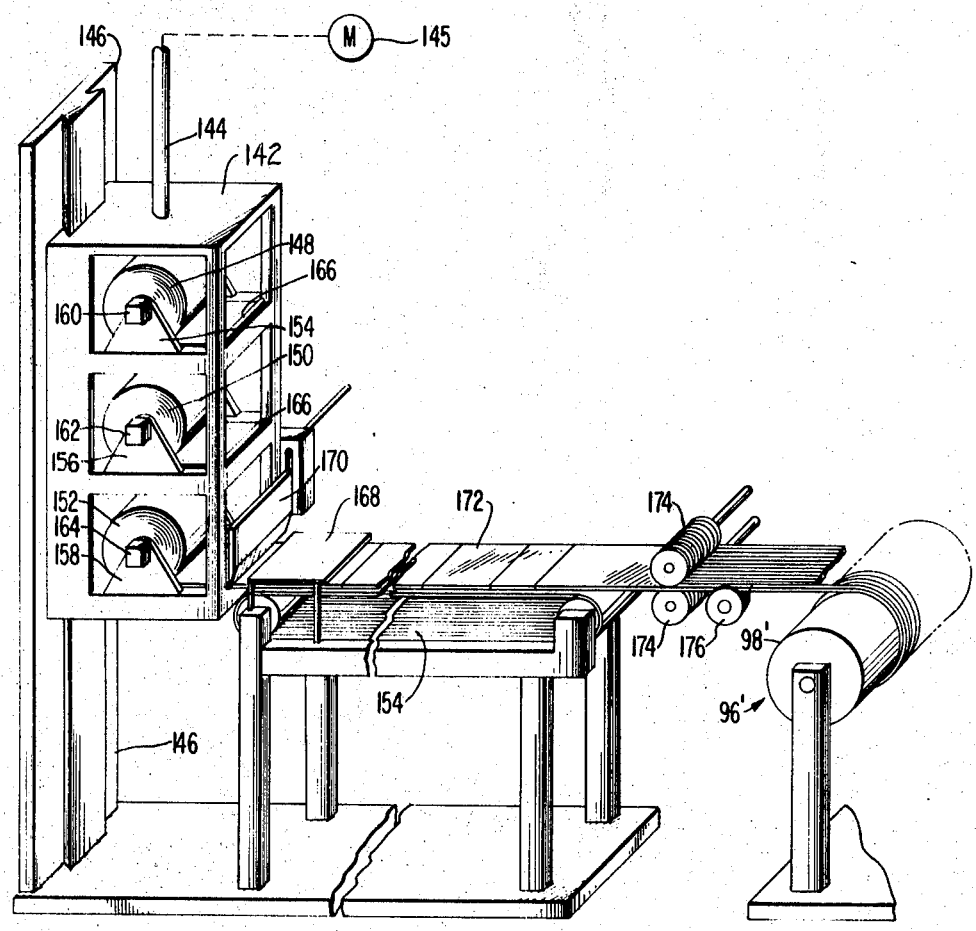
FIG. 12 schematically depicts another patterned article-making system embodying principles of the invention.

FIG. 12 shows another system for producing filaments in continuous strands. Carriage 142 is oscillated vertically by a motor 145 operatively connected in a conventional manner to shaft 144. Carriage 142 rides on a frame 146, and carries coils 148, 150, 152 of flexible thermoplastic material of differing color. The coils are spaced vertically on carriage 142 and are formed on spools rotatably mounted in brackets 154, 156, 158. Electric motors 160, 162, 164 mounted on the respective brackets rotate the spools. An endless conveyor 154 is positioned adjacent carriage 142. By vertical movement of carriage 142, each coil on the carriage can be registered with the upper conveyor reach to deposit a portion of the coil on the conveyor.

When a coil of desired material is registered with conveyor 154, the associated bracket-mounted motor is energized to rotate the coil and unwind a portion under a flattener roll 166 and deposit the unrolled portion on the conveyor under a heater 168, which also flattens the uncoiled portion against the conveyor. Heater 168 fusion bonds the unrolled portion to coil portions previously deposited and moved forwardly by the conveyor. When the desired length has been unrolled and joined to the previously deposited lengths, knife 170 is operated to sever the unwound portion of the coil. The carriage is operated to align a different coil with the conveyor, which is operated to move the newly joined portion to accommodate a subsequent portion. The process is thus repeated to form a continuous strip 172 composed of a series of segments of differing color. The strip can be folded and shaved in the manner discussed in connection with FIG. 11, or slit as shown in FIG. 12, into a plurality of continuous strands by cooperating rotary slitters 174. The strands are guided over pulleys 176 to positioners such as 96', which act as did positioner 96 in FIG. 3, spirally winding the strand, positioning portions of the strand beside one another with segments of differing properties aligned transversely in patterns, and joining transversely contiguous portions to one another.

From consideration of the foregoing illustrative embodiments, it is apparent that the invention provides articles of any desired patterns with the patterns being as durable as the articles. The patterns described have been established by use of materials of differing color, but it will be understood that the segments can differ in a property other than color, and a patterned article with a pattern of segments differing in the selected property can be created.

I claim:
1. Process for making patterned articles, comprising:
providing a plurality of elongated filaments,
each filament including a series of segments,
at least one segment in the series differing in color from a serially contiguous segment,
each filament having transversely opposite sides,
positioning the filaments beside one another with segments of each filament aligned transversely in a pattern with segments of a transversely contiguous filament, and
joining opposing sides of transversely contiguous filaments to one another.

2. The process of claim 1, the filaments being of thermoplastic material.

3. The process of claim 2, the step of joining opposing sides of transversely contiguous filaments to one another including heating the transversely contiguous filaments to bond the opposing sides to one another.

4. The process of claim 1, each filament having a width dimension between said opposite sides and a thickness dimension generally normal to the width dimension, and the filaments being of uniform thickness dimension.

5. The process of claim 1, each of the filaments having opposite ends, the plurality of filaments being sequentially joined end-to-end in a continuous strand, the step of positioning the filaments beside one another including:
spirally winding the continuous strand on a mandrel to form a tube, and
each convolution of the spirally wound strand constituting one of the filaments.

6. The process of claim 5, wherein the mandrel has a longitudinal axis, and including the steps of:
moving the tube axially relative to the mandrel slitting the moving tube axially relative to the mandrel, and flattening the slit tube into a continuous sheet.

7. The process of claim 1, each of the filaments having opposite ends, the plurality of filaments being sequentially joined end-to-end in a continuous strand, the step of positioning the filaments beside one another including:
folding the continuous strand in laps on a substrate, and each lap of the folded strand constituting one of the filaments.

8. The process of claim 7, wherein each filament has a width dimension between the opposite sides and a thickness dimension generally normal to and substantially greater than the width dimension, wherein the folded strand forms a block, and including the step of shaving sheets of uniform thickness from the block along a plane generally normal to the thickness dimension of the filaments.

9. A patterned article of manufacture, comprising:
a plurality of elongated filaments,
each filament including a series of segments,
at least one segment in the series differing in color from a serially contiguous segment,
each filament having transversely opposite sides,
the filaments being positioned beside one another with segments of each filament aligned transversely in a pattern with segments of a transversely contiguous filament, and
opposing sides of transversely contiguous filaments being joined to one another.

10. The process of claim 1, the one segment having a transverse cross-section and differing in color from the serially contiguous segment throughout the cross-section.

11. The article of claim 9, the one segment having a transverse cross-section and differing in color from the serially contiguous segment throughout the cross-section.

12. The article of claim 9, each filament having a width dimension between the opposite sides and a thickness dimension generally normal to the width dimension, and the filaments being of uniform thickness dimension.

References Cited

UNITED STATES PATENTS

| | | | |
|---|---|---|---|
| 2,198,448 | 4/1940 | Allquist et al. | 156—167 |
| 2,344,457 | 3/1944 | Christ | 161—60 |
| 3,009,822 | 11/1961 | Drelich et al. | 161—60X |
| 3,046,178 | 7/1962 | Tupper | 156—167 |

PHILIP DIER, Primary Examiner

U.S. Cl. X.R.

156—167, 174, 175, 204, 268, 304, 306; 161—142; 264—176